United States Patent
Bisson et al.

(10) Patent No.: US 9,580,347 B2
(45) Date of Patent: Feb. 28, 2017

(54) SYSTEM AND METHOD FOR FORMING A GLASS SHEET

(75) Inventors: Antoine Gaston Denis Bisson, Montigny Lencoup (FR); Allan Mark Fredholm, Vulaines sur Seine (FR); Laurent Joubaud, Paris (FR)

(73) Assignee: Corning Incorporated, Corning, NY (US)

( * ) Notice: Subject to any disclaimer, the term of this patent is extended or adjusted under 35 U.S.C. 154(b) by 441 days.

(21) Appl. No.: 13/814,822

(22) PCT Filed: May 26, 2011

(86) PCT No.: PCT/US2011/038107
§ 371 (c)(1),
(2), (4) Date: May 13, 2013

(87) PCT Pub. No.: WO2011/153062
PCT Pub. Date: Dec. 8, 2011

(65) Prior Publication Data
US 2013/0319051 A1 Dec. 5, 2013

(30) Foreign Application Priority Data
May 31, 2010 (EP) .................................... 10305572

(51) Int. Cl.
*C03B 18/16* (2006.01)
*C03B 18/04* (2006.01)
*C03B 5/26* (2006.01)

(52) U.S. Cl.
CPC ................ *C03B 18/16* (2013.01); *C03B 5/26* (2013.01); *C03B 18/04* (2013.01)

(58) Field of Classification Search
CPC ........... C03B 18/00–18/22; C03B 5/26; C03B 5/265; C03B 5/267
See application file for complete search history.

(56) References Cited

U.S. PATENT DOCUMENTS

| | | | | |
|---|---|---|---|---|
| 3,351,452 | A * | 11/1967 | Robinson | 65/182.1 |
| 4,013,438 | A * | 3/1977 | Gladieux | C03B 18/06 65/182.4 |
| 4,116,660 | A * | 9/1978 | Zortea | 65/99.5 |
| 4,149,895 | A | 4/1979 | Boudot et al. | 106/52 |
| 4,741,749 | A * | 5/1988 | Sensi et al. | 65/99.2 |
| 5,525,554 | A | 6/1996 | Comte | 501/64 |

(Continued)

FOREIGN PATENT DOCUMENTS

| | | | | |
|---|---|---|---|---|
| FR | 2866328 | | 8/2005 | C03B 18/18 |
| GB | 1073603 | | 6/1967 | C03B 17/00 |

(Continued)

OTHER PUBLICATIONS

L.A.B. Pilkington, "The Float Glass Process", Proc. Roy. Soc. Lond., vol. 314, pp. 1-25 (Dec. 16, 1969).

(Continued)

*Primary Examiner* — Lisa Herring

(57) ABSTRACT

A glass forming system (200) and a method are described herein for forming a glass sheet (230). In one example, the glass forming system and method can use a glass composition with a liquidus viscosity less than 1000 poises to continuously form a glass sheet.

7 Claims, 7 Drawing Sheets

(56) References Cited

U.S. PATENT DOCUMENTS

| | | | |
|---|---|---|---|
| 2007/0051136 A1* | 3/2007 | Watkinson | C03B 5/26 |
| | | | 65/384 |
| 2007/0101765 A1 | 5/2007 | Loeffelbein et al. | 65/99.1 |
| 2008/0149863 A1* | 6/2008 | Rodriguez Cuartas et al. | 250/515.1 |
| 2009/0217705 A1 | 9/2009 | Filippov et al. | 65/99.1 |

FOREIGN PATENT DOCUMENTS

| | | | |
|---|---|---|---|
| GB | 1381625 | 1/1975 | C03B 18/02 |
| IN | 2006KN1872 A * | 5/2007 | |

OTHER PUBLICATIONS

Rawson, Harold, Properties and applications of glass, Dec. 31, 1980 (Dec. 31, 1980) Elsevier, Amsterdam, pp. 180.

\* cited by examiner

SYSTEM AND METHOD FOR FORMING A GLASS SHEET

This application claims the benefit of priority to European Application No. 10305572.9 filed on May 31, 2010.

TECHNICAL FIELD

The present invention relates to a glass forming system and a method for forming a glass sheet. In one example, the glass forming system and method can use a glass composition with a liquidus viscosity less than 1000 poises to continuously form a glass sheet.

BACKGROUND

Glass produced in the form of a sheet has a very broad range of uses including being used in architectural applications, automotive applications, liquid crystal display (LCD) applications etc.

Today several glass sheet forming processes are being used to manufacture glass sheets. Each of the glass sheet forming processes has limitations in terms of a working range and product properties which limit the domain of glass compositions that can be used to make glass sheets. One of the main product properties that limit the use of glass compositions is the liquidus temperature. The liquidus temperature corresponds to a practical viscosity below which the glass sheet forming process may not be maintained in continuous conditions.

The fusion draw process has the ability to produce a glass sheet with very good surface qualities, usable for instance in thin-film transistor (TFT) applications without needing prior surface polishing. The fusion drawn glass sheet which has pristine surfaces can be produced in the 0.1 to 3 mm thickness range. The limit of the fusion draw process, considering gravity effects, is that the glass sheet forming must take place with glass that has a viscosity which is higher than 40000 poises. This means that every glass composition which has a liquidus viscosity that is below 40000 poises cannot be practically formed into a glass sheet by utilizing the fusion draw process.

The rolling process produces a glass sheet that has surfaces which have traces of contact between glass and forming rolls. The rolled glass sheet can be produced in the 2 to 50 mm thickness range. The limit of the horizontally oriented version of the rolling process is that the glass sheet forming must take place with a glass that has a viscosity higher than 3000 poises. This means that every glass composition which has a liquidus viscosity that is below 3000 poises cannot be practically formed into a glass sheet by utilizing the horizontally oriented rolling process.

The float process produces a glass sheet which can be very large in size and can be manufactured at extremely high flow rates. The glass sheet which is produced by the float process has pristine surfaces and a thickness in the range of between 0.3 and 10 mm. FIGS. 1A-1B (PRIOR ART) illustrate a traditional float system 100 which has a structure 102 within which a molten glass 104 flows over a lip-stone 106 and free falls onto a liquid tin bath 108 and then flows over the liquid tin bath 108 to form a glass sheet 110. The traditional float system 100 also includes heaters 112 and an atmospheric opening 114. The traditional float system 100 is described in detail within an article by L. A. B. Pilkington "The Float Glass Process", Proc. Roy. Soc. Lond., Vol. 314, pp 1-25 (16 Dec. 1969). The contents of this article are hereby incorporated herein by reference.

The float process generally works well when used to make glass sheets for architectural and automotive purposes. However, the float process also has a limitation where glass compositions which have a liquidus viscosity around 1000 poises cannot be practically formed into a glass sheet. This limitation occurs because the float process utilizes the lip-stone 106 to deliver the molten glass 104 to the liquid tin bath 108. In general, the lip-stone 106 can continuously spread glass with a viscosity around 3000 poises. However, due to a significant free surface flow on the lip-stone 106 before the molten glass 104 is delivered to the liquid tin bath 108 means that a significant volatization would occur in glass which has a viscosity in the 1000 poises range. This means that every glass composition which has a liquidus viscosity that is below 1000 poises will undergo volatization when formed into a glass sheet by utilizing the current float process. Thus, the float process needs to be adapted to improve the delivery of the molten glass 104 to the liquid tin bath 108 in order to be able to continuously form a glass sheet from a glass composition which has a liquidus viscosity less than 1000 poises. This need and other needs will be satisified by the present invention.

SUMMARY

A glass forming system and a method are described in the independent claims of the present application. Advantageous embodiments are described in the dependent claims.

In one aspect of the present invention, a glass forming system is described which forms a glass sheet. The glass forming system includes: (a) a structure including a top surface, a bottom surface and a containing wall all of which are attached to one another to form a space within which there is located a bath of molten metal that covers the bottom surface and contacts a lower portion of the containing wall; (b) a delivery device for delivering a free falling molten glass onto a portion of the molten metal located in a delivery area within the structure; and (c) one or more devices for eliminating dead zones in the delivery area to reduce a residence time of the molten glass in the delivery area and to enable a substantially continuous flow of the molten glass over the molten metal when forming the glass sheet. For example, the device(s) which can eliminate the dead zones in the delivery area include one or more of the following: (i) a gas supply that provides a gas which passes through pores extending through at least a portion of the containing wall associated with the delivery area so as to form a gas cushion which repels the molten glass away from at least that portion of the containing wall; (ii) the containing wall being specially configured to have a substantially semi-circular channel around the delivery area and a substantially diverging channel extending in one direction away from the delivery area; (3) the delivery device being positioned above the molten metal such that there is a substantially small free fall height (less than 100 mm); (4) the delivery device being bent to orient the flow of the free falling molten glass that is received in the delivery area in a downstream direction away from the delivery area; and (5) the delivery device having a heater that heats the molten glass to control a viscosity of the molten glass that is free falling onto the portion of the molten metal.

In another aspect of the present invention, a method is described for forming a glass sheet. The method includes the steps of: (a) providing a structure including a top surface, a bottom surface and a containing wall all of which are attached to one another to form a space within which there is located a bath of molten metal that covers the bottom surface and contacts a lower portion of the containing wall; (b) delivering a free falling molten glass from a delivery device onto a portion of the molten metal located in the delivery area within the structure; and (c) eliminating dead zones in the delivery area within the structure to reduce a residence time of the molten glass in the delivery area and to enable a substantially continuous flow of the molten glass over the molten metal when forming the glass sheet. For example, the eliminating step can further include one or more of the following steps: (i) using a gas supply that provides a gas which passes through pores extending through at least a portion of the containing wall associated with the delivery area so as to form a gas cushion which repels the molten glass away from at least that portion of the containing wall; (ii) using a specially configured containing wall that has a substantially semi-circular channel around the delivery area and a substantially diverging channel extending in one direction away from the delivery area; (3) positioning the delivery device above the molten metal such that there is a substantially small free fall height (less than 100 mm); (4) bending the delivery device to orient the flow of the free falling molten glass that is received in the delivery area in a downstream direction away from the delivery area; and (5) heating the delivery device to control that viscosity of the molten glass that is free falling onto the portion of the molten metal.

Additional aspects of the present solution will be set forth, in part, in the detailed description, figures and any claims which follow, and in part will be derived from the detailed description, or can be learned by practice of the present solution. It is to be understood that both the foregoing general description and the following detailed description are exemplary and explanatory only and are not restrictive of the present solution as disclosed.

BRIEF DESCRIPTION OF THE DRAWINGS

A more complete understanding of the present solution may be had by reference to the following detailed description when taken in conjunction with the accompanying drawings wherein.

DETAILED DESCRIPTION

The present invention adapts the traditional float process to make it applicable for glasses needing to be delivered to the liquid tin (or other molten metal) at very low viscosities. As an example, there is a need today to produce high refractive index glass sheets. Glasses with a high refractive index of around 1.7 are available, but their liquidus viscosity is typically in the few hundred poise viscosity range. Thus, high refractive index glasses cannot be produced by the traditional float process as well as the other continuous sheet forming processes. The enhanced glass forming system described herein (as well as the corresponding process) makes it possible to make high quality glass sheets and if desired high refractive index glass sheets from glass compositions which need to be delivered at viscosities lower than 1000 poises (indeed significantly lower than 1000 poises). It is in particular suitable for forming glasses needing around a 200 poises delivery viscosity (indeed a delivery viscosity less than 200 poises). It is also believed to be applicable for forming glasses with delivery viscosities in range of 1-10 poises. The enhanced glass forming system and method are described in detail below with respect to FIGS. 2A-2B.

Figure 1A:
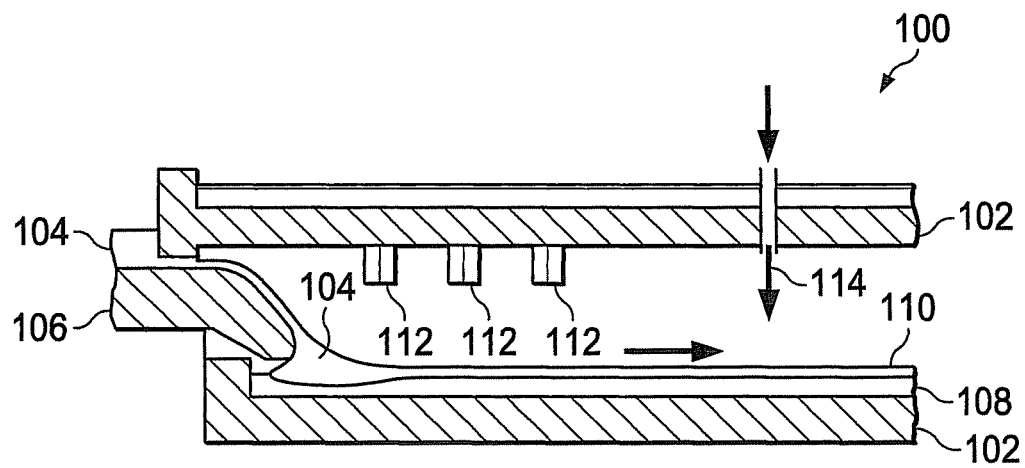
FIGS. 1A-1B (PRIOR ART) respectively illustrate a cross-sectional schematic view of a traditional float system and a perspective schematic view of a lip-stone used in the traditional float system.
Figure 1B:
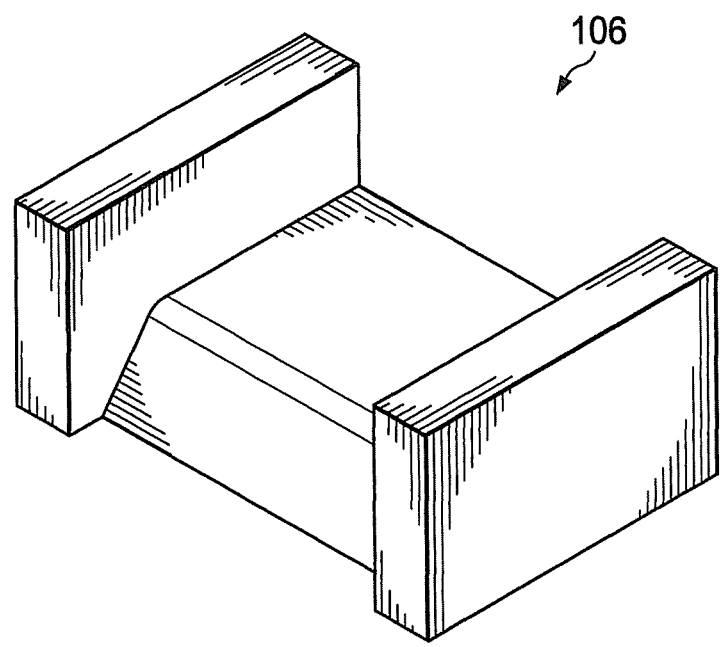
Figure 2A:
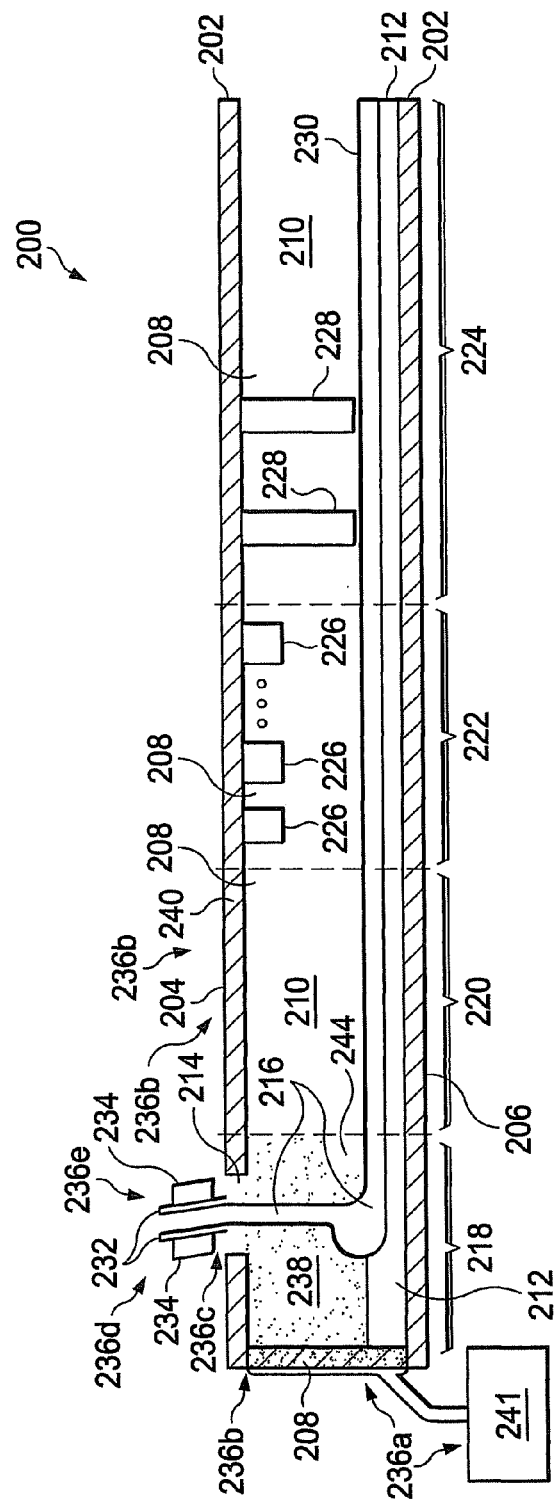
FIGS. 2A-2B respectively illustrate a cross-sectional schematic view and a cross-sectional top view of a glass forming system in accordance with an embodiment of the present invention.
Figure 2B:
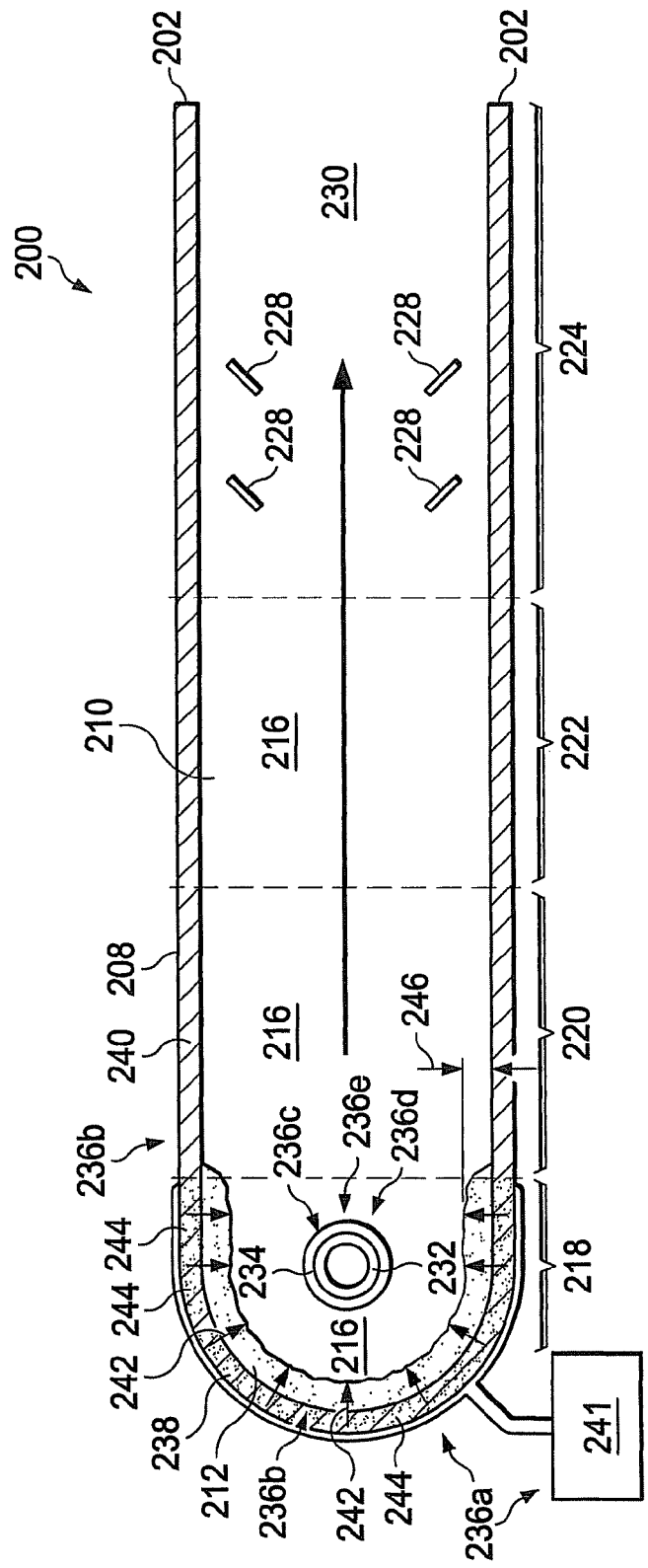

Referring to FIGS. 2A-2B, there are respectively illustrated a cross-sectional schematic view and a cross-sectional top view of an exemplary glass forming system 200 in accordance with an embodiment of the present invention. The exemplary glass forming system 200 includes a structure 202 with a top surface 204, a bottom surface 206, and a containing wall 208. The top surface 204 is attached to an upper end of the containing wall 208 which has a lower end attached to the bottom surface 206 to form a space 210 within which there is located a bath of molten metal 212 (e.g., liquid tin bath 212). The molten metal 212 covers the bottom surface 206 and contacts a lower portion of the containing wall 208. The top surface 204 has an opening 214 formed therein through which a free falling molten glass 216 flows before being delivered onto the molten metal 212.

In this example, the structure 202 has four different process areas which are referred to herein as a delivery area 218, a diverging area 220, a thermal conditioning area 222, and a float drawing area 224. The delivery area 218 is where the free falling molten glass 216 is delivered to the molten metal 212. The diverging area 220 is where the delivered molten glass 216 now flowing on the molten metal 212 spreads until the molten glass 216 reaches an equilibrium thickness of around 7 mm (for instance). The thermal conditioning area 222 is where the spread molten glass 216 still flowing on the molten metal 212 is cooled by one or more cooling elements 226 (e.g., tubular water cooled elements 226). The thermal conditioning area 222 can quickly cool the molten glass 216 so it has a viscosity that is in the range of 80000 poises (for instance). The float drawing area 224 is where the cooled molten glass 216 still flowing on the molten metal 210 is drawn by one or more top rolls 228 to from a glass sheet 230. As can be seen, the molten glass 216 effectively travels from the delivery area 218 to the diverging area 220 then to the thermal conditioning area 222 and finally to float drawing area 224 where it is drawn to form the glass sheet 230.

The exemplary glass forming system 200 also includes a delivery device 232 that delivers the free falling molten glass 216 onto a portion of the molten metal 212 which is located in the delivery area 216. In the illustrated example, the delivery device 232 is a tube which is very well adapted for low viscosity fluids. Alternatively, the delivery device 232 can be a rod or a needle around which the molten glass 216 flows before free falling to the molten metal 212. In this example, the delivery device 232 is shown located outside the structure 202 but any portion of it could also be located within the structure 202.

The exemplary glass forming system 200 further includes one or more devices 236a, 236b, 236c, 236d, and 236e that individually or in any combination function to eliminate dead zones in the delivery area 218 to reduce a residence time of the molten glass 216 in the delivery area 218 so as to enable a substantially continuous flow of the molten glass 216 over the molten metal 212 when forming the glass sheet 230. It is desirable to avoid dead zones in the delivery area 218 where the molten glass 216 has long residence times because this leads to devitrification and compositional changes in the molten glass 214 which adversely affect the quality of the resulting glass sheet 230. Five exemplary devices 236a, 236b, 236c, 236d, and 236e are described next where anyone or any combination of them effectively reduces or eliminates the dead zones in the delivery area 218.

The first device 236a includes a gas supply unit 241 that provides a gas 242 (e.g., nitrogen 242) which passes through pores 244 extending through at least a portion of the containing wall 208 associated with the delivery area 218 to form a gas cushion 246 which repels the molten glass 216 away from that particular portion of the containing wall 208 (e.g., made from porous graphite). The gas cushion 246 effectively forms a "containing fence" which limits the contact of the molten glass 216 with the containing wall 208. If desired, at least a portion of the containing wall 208 associated with the diverging area 222 may be porous as well to allow the gas 242 to flow there through to further extend the gas cushion 246.

The second device 236b is a specially shaped containing wall 208 configured to have a substantially semi-circular channel 238 located around the delivery area 218 and a substantially diverging channel 240 (forming the diverging area 220) that extends in one direction away from the delivery area 218. The specially shaped containing wall 208 is configured to limit the contact of the molten glass 216 with the semi-circular channel 238. The limited contact of the molten glass 216 with any surface especially in the delivery area 218 is desirable since the molten glass 216 which has a very low viscosity (e.g., less than 1000 poises) has a tendency to stick to the containing wall 208 thus creating dead zones.

The third device 236c includes the delivery device 232 being positioned above the molten metal 212 such that there is a substantially small free fall height that is for example less than 100 mm and more preferred less than 50 mm. As discussed earlier, the delivery device 232 can be a tube, a rod or a needle through which or around the molten glass 216 flows before free falling onto to the molten metal 212.

The fourth device 236d includes the delivery device 232 being bent to orient the flow of the free falling molten glass 216 delivered to the molten metal 212 in a downstream direction away from the delivery area 218 and towards the diverging area 220. The bent deliver device 232 would also help avoid back-flows of the delivered molten glass 216.

The fifth delivery device 236e includes the delivery device 232 (e.g., tube 232) having a heater 234 (e.g., induction heater 234) located around at least or portion thereof that heats the molten glass 216 to help control the viscosity of the free falling molten glass 216. As can be appreciated, anyone or more of the devices 236a, 236b, 236c, 236d and 236e effectively prevent the need for using the lip-stone which is associated with the traditional float system.

Simulation of a glass flow in conditions typical of an industrial application for a specialty high refractive index glass has been performed to confirm the feasibility of the glass forming system 200 by for instance evaluating the flow properties of the glass and the required thermal environment. The conditions used for the simulation are as follows:

Glass composition (% weight): $SiO_2$:40.5, $Na_2O$:3.1, $K_2O$:5.8, CaO:5.2, BaO:15.9; SrO:0.5, $ZrO_2$:8.7, $Nb_2O_5$:3.4, $TiO_2$:16.3

Glass properties: refractive index 1.7; liquidus at 200 poises (1140° C.); 200000 poises at 950° C. which is the viscosity at which the glass flow can be stretched by the top rolls 228 to reach the desired final thickness.

Glass flow-rate: 30 tons/day

Delivery Device 232: Tube orifice diameter: 50 mm, outlet 20 mm above the tin bath 212.

Cooling zone 222 length is 1.5 m.

The devices 236b, 236c and 236e where implicitly used in the simulation

Figure 3A:
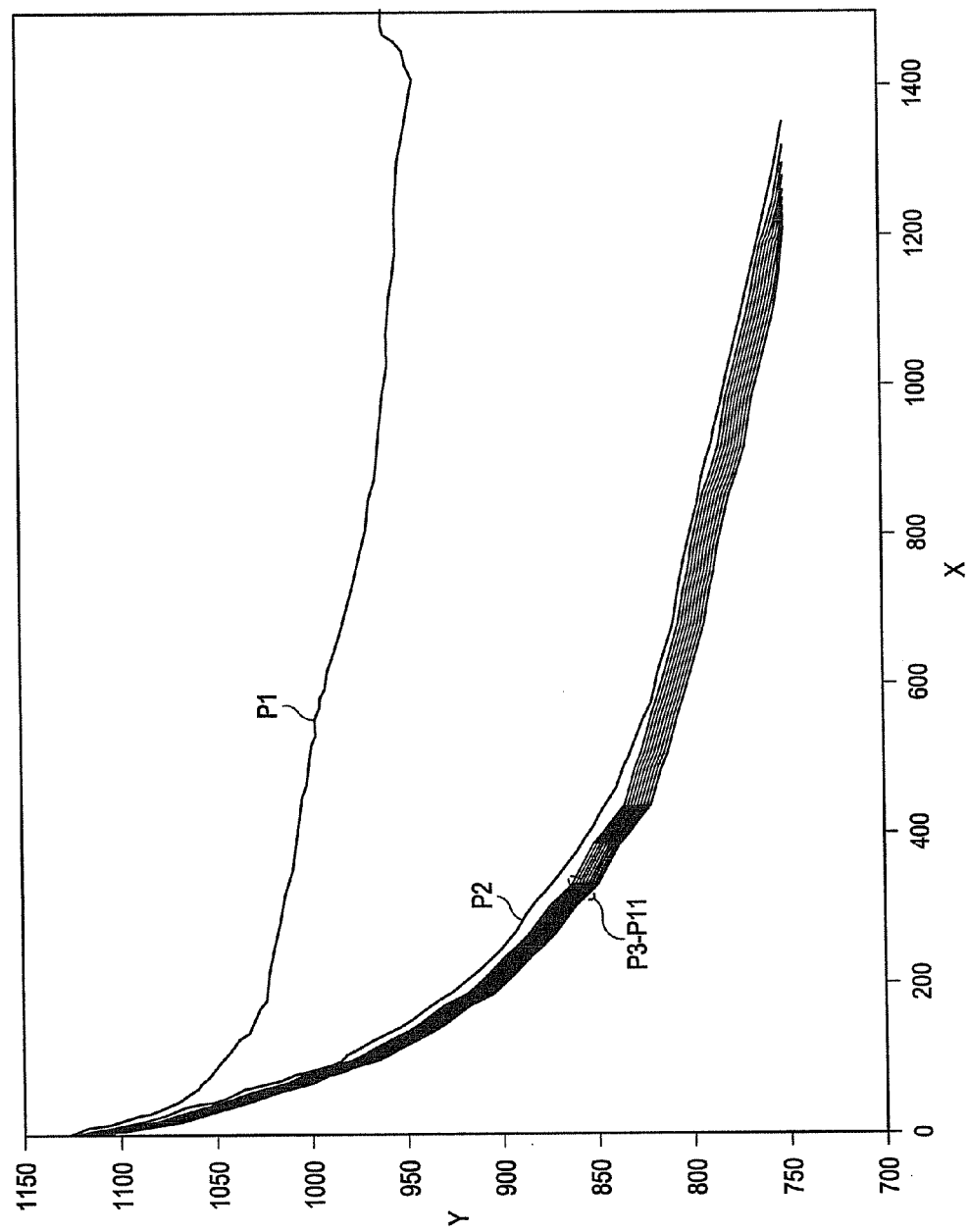
FIGS. 3A-3E are various graphs which illustrate the results of a simulation performed to confirm the feasibility of the glass forming system shown in FIGS. 2A-2B.
Figure 3B:
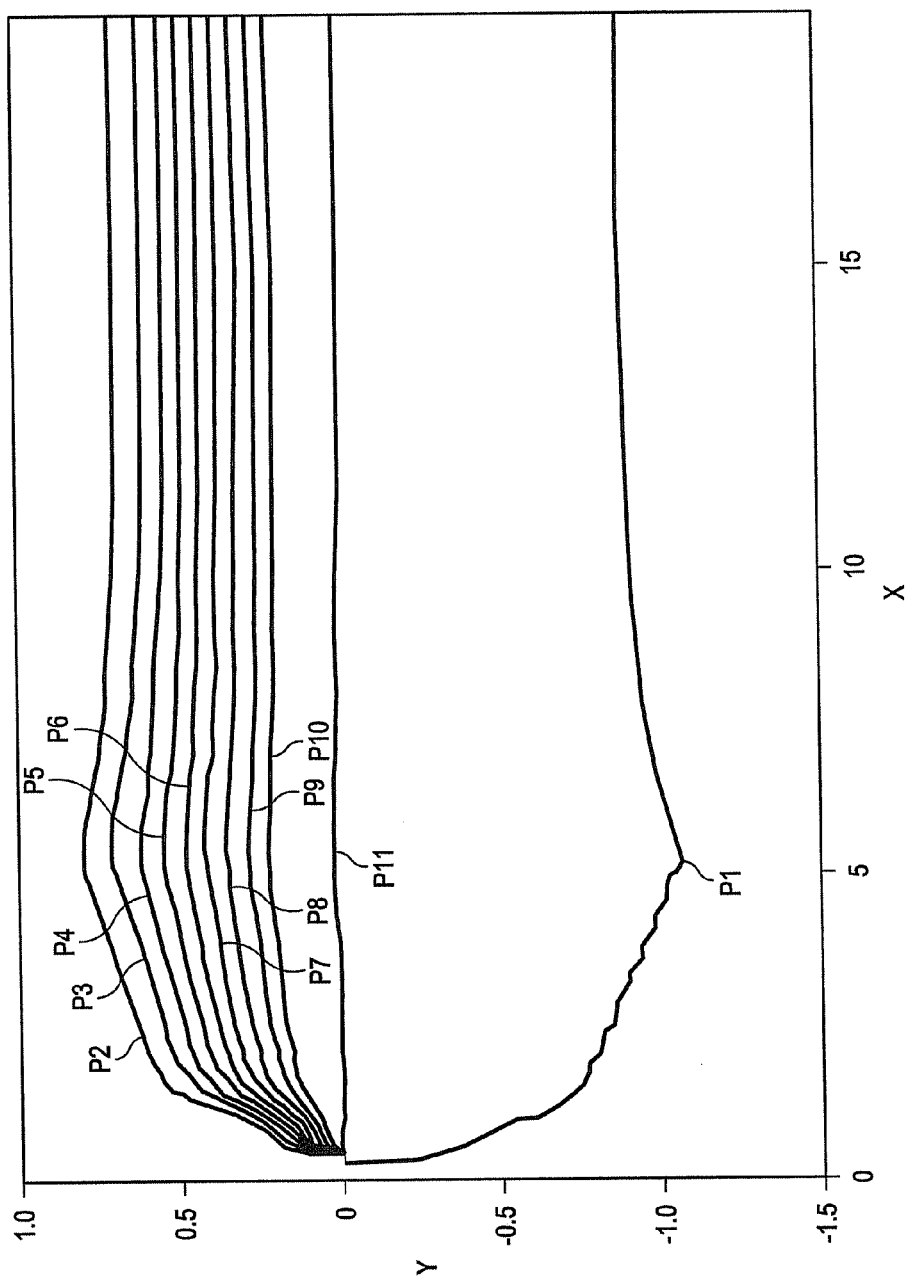

Referring to FIGS. 3A-3B, there are two graphs which indicate the simulated times/temperatures for eleven different particle paths (p1-p11) of the molten glass 216 flowing from the delivery area 218 to the float drawing area 224 after being delivered by a straight delivery tube 232. The two graphs indicate that the molten glass 216 flowing out of the orifice of the straight delivery tube 232 has several trajectories, which induce several different time/temperature histories. Some of the molten glass 216 flows out directly to the diverging area 220 and will experience a rapid temperature decrease over time (for example see particle path p4). Some of the molten glass 216 will remain for a longer time within the delivery area 218 such as for example the molten glass 216 that flows at the back side of the delivery tube 232. This molten glass 216 will have a longer residence time at high temperature because it travels a longer distance (for example see particle path p1). FIG. 3A's graph has an x-axis which represents time (seconds) and a y-axis which represents temperature (° C.). FIG. 3B's graph has an x-axis and a y-axis which are both in meters.

Figure 3C:
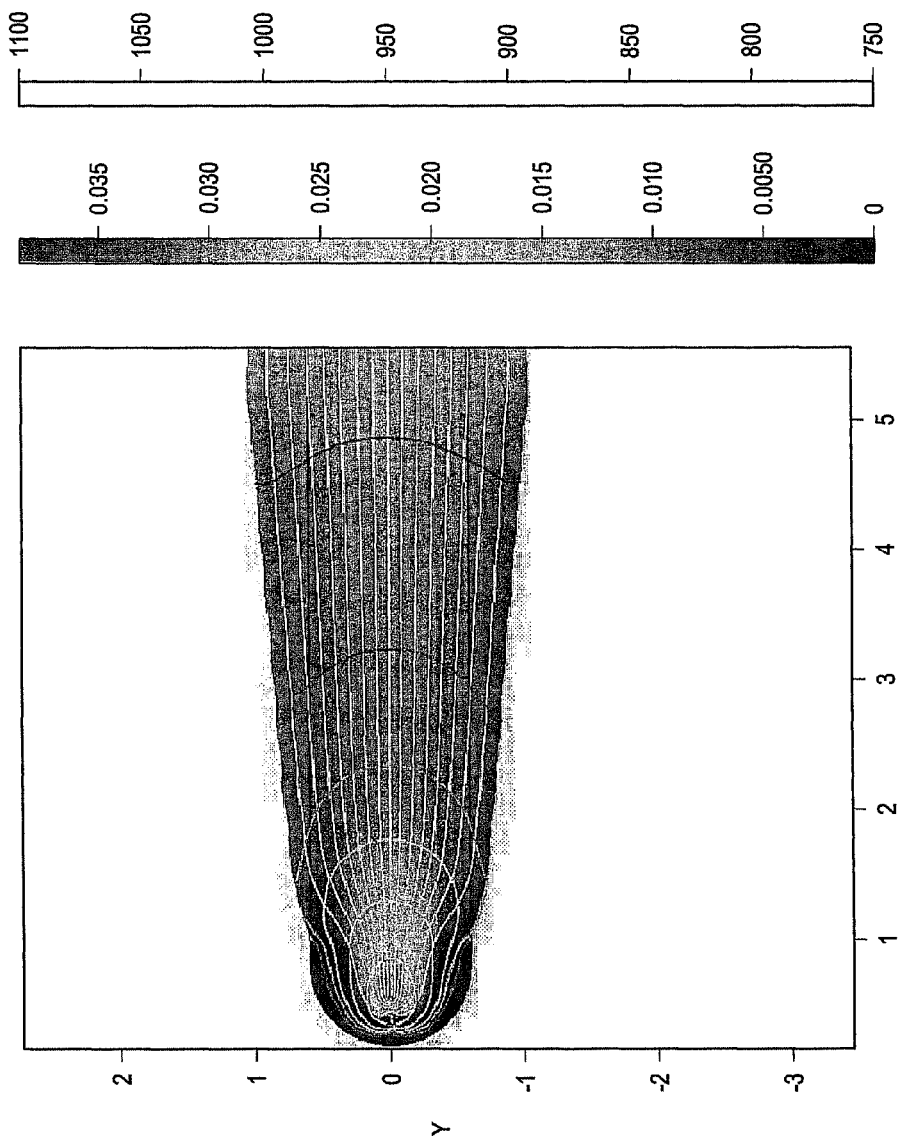

Referring to FIG. 3C, there is illustrated a top view of a simulated 2D glass flow which shows the temperature contours and glass velocities based on the times/temperatures of the different particle flows p1-p11 (FIGS. 3A-3B) of the molten glass 216 flowing within the delivery area 218, the diverging area 220, the thermal conditioning area 222, and the float drawing area 224. This graph has an x-axis which represents a longitudinal direction (m) of the structure 202 and a y-axis which represents a transverse direction (m) of the structure 202. These temperature contours and glass velocities are the criteria which can be used to determine if devitrification is prone to take place during the transition of the molten glass 216 from a low viscosity (in the delivery area 218) to a high viscosity (in the float drawing area 224). If desired, one can use a devitrification curve for the glass of interest which indicates the crystal size as a function of time and temperature to predict the maximum crystal size in the final glass sheet 230.

Figure 3D:
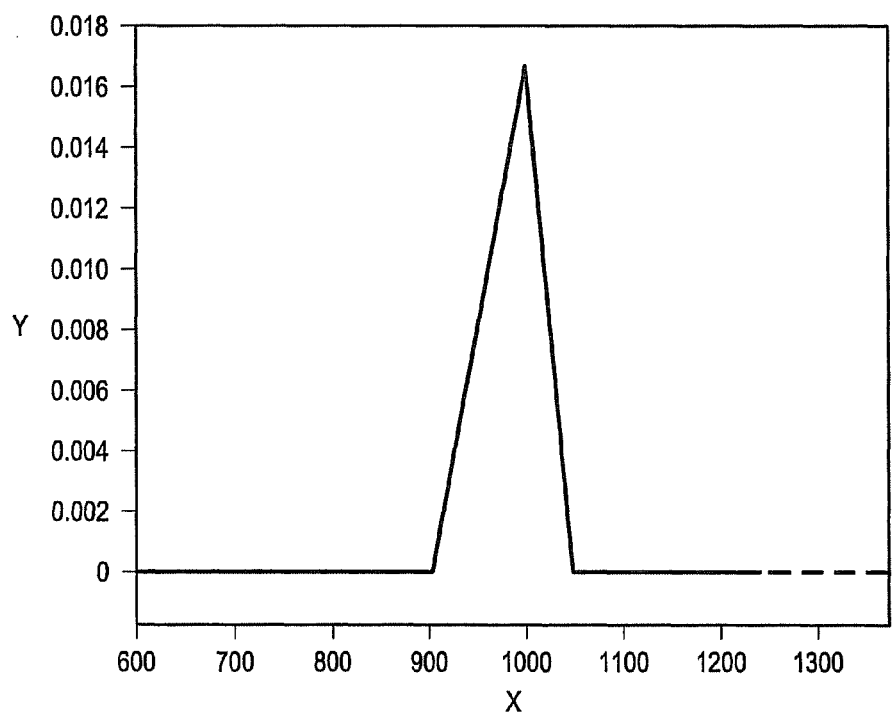

Referring to FIG. 3D, there is illustrated an exemplary devitrification curve which shows a simplified shape of the typical crystal growth rate (μm/min units, y-axis) in glass as a function of temperature (° C., x-axis). The devitrification of glass occurs around a given temperature, with a maximum growth rate at for instance Tcmax and when the temperature is close to Tcmax then crystallization occurs but more slowly. For instance, depending on the glass composition, crystallization may not occur any more when the temperature is 50-100° C. above and below Tcmax. It is important to know this devitrification curve for the glass of interest, because when this information is coupled to the time/temperature history data one can predict the size of the crystals that could grow in the molten glass 216 during the cooling step.

Figure 3E:
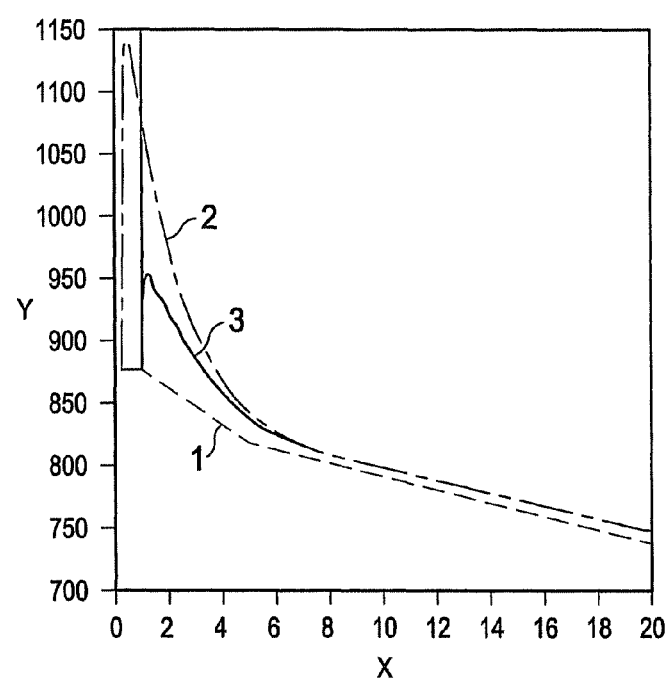

Referring to FIG. 3E, there is illustrated a graph which illustrates the thermal environment that was imposed in the simulation to ensure the sufficiently rapid cooling of the molten glass 216. In this graph, the numeral "1" indicates the temperature of the environment, the numeral "2" indicates the temperature of center of glass flow, and the numeral "3"

indicates the temperature of edges of the glass flow as a function of the distance from the delivery area 218. The x-axis is a distance (meters) of the glass flow and the y-axis is the temperature (° C.). As can be seen, the environment temperature (numeral "1") needs to be significantly cooler than the glass (numerals "2" and "3") which can be achieved by using transverse tubular water cooled elements 226 (for instance) within the thermal conditioning area 222.

If desired, the diffusion of the molten metal 212 with the molten glass 216 can be simulated, evaluated and the process conditions can be modified to limit the metal diffusion if this leads to undesirable properties in the resulting glass sheet 232. The metal diffusion is activated by temperature where the higher a temperature is at the interface between molten metal 212 and the molten glass 216 then the higher the diffusion. Also time plays a role, where a longer contact time leads to a higher diffusion so if one can limit the time the molten glass 216 is at a high temperature and the time it takes to cool down the molten glass 216 then the overall metal diffusion will be low.

The following are some conclusions that can be made in view of the aforementioned simulation:

(1) The natural spreading of the molten glass 216, thanks to the low viscosity at the delivery, takes place rapidly to transform a circular flow into a ribbon flow. This limits the time where the molten glass 216 has a free surface exposed to the atmosphere at viscosities where volatilization can adversely affect the homogeneity of the molten glass 216.

(2) The required cooling zone that can cause the molten glass 216 to go quickly from the delivery viscosity to a viscosity that is sufficiently high to inhibit devitrification is practically feasible. If one considers the residence time in the devitrification range, then the results indicate that the crystal growth, thermodynamically possible, can be limited by kinetics. For instance, to have crystals in a glass, two conditions are required: (1) temperature (thermodynamical condition); and (2) time (kinetic condition). Thus, if time is short then the crystallization will be limited by kinetics.

(3) The heat transfer simulation indicated that the heat fluxes required for cooling are significant. In order to cool the molten glass 216 sufficiently fast, the glass flow may be cooled from both sides, by conduction with the molten metal 212 and by radiation with the upper walls of the containing wall 208. Too high of a conduction transfer with the molten metal 212 should be carefully considered as convection and associated perturbations may arise. To address this concern, a shallow layer of molten metal 212 coupled with the appropriate temperature control from the bottom side can be used. For example, the temperature of the molten metal 212 can be controlled from the bottom side by taking into account that convection cells will occur if the temperature gradient is too large and such convection cells can be limited by using separators inside the molten metal 212. On the other side, radiation transfer may be realized with temperature differences close to 200-300° C. between walls and the molten glass 216. For instance, distinct thermal zones along the length of the molten metal 219 could to be installed to control the temperature decrease. Furthermore, the total length of the cooling area may be adjusted to fit the total heat fluxes required, but this parameter is to be limited because of its effect on the time/temperature parameter.

(4) In the direct environment of the delivery device 232 (delivery tube 232), a local heating technique of the tube 232 can be used to control glass viscosity in the tube 232 without preventing rapid cooling of the glass 216 spreading on the molten metal 212. An induction heating technique can advantageously be used for this application From the foregoing, one skilled in the art will appreciate that the glass forming system 200 and method described herein have several advantages in that they allow the in-line, high throughput manufacture of high quality glass sheets from glasses that have a low liquidus viscosity which is not possible with the traditional float processing method or the other continuous sheet forming processes. In particular, the glass forming system 200 can manufacture glasses with high refractive index which would be valuable for use in organic light emitting diode (OLED) lighting applications. This is possible because the layout of the glass delivery onto the molten metal 212 is done such that the residence time of the molten glass 216 at a temperature where it is prone to devitrification or diffusion with the molten metal 212 is sufficiently short. Also, the use of a very low viscosity delivery allows a quick spreading of the molten glass 216 from a compact and confined environment (e.g. a tube) to a wide and thin ribbon that is ready for sheet drawing. This all results in a short exposure of the free surface of the molten glass 216 to conditions where volatilization of elements may take place. The fast cooling required from the delivery of the molten glass 216 to the beginning of drawing can also be eased by the fact that the delivery device 232 can be kept locally hot while not hindering the capacity to rapidly cool the molten glass 216 in the immediate area surrounding the glass inlet.

Although one embodiment of the present solution has been illustrated in the accompanying Drawings and described in the foregoing Detailed Description, it should be understood that the solution is not limited to the disclosed embodiments, but is capable of numerous rearrangements, modifications and substitutions without departing from the solution as set forth and defined by the following claims.

The invention claimed is:

1. A glass forming system, comprising:
   a structure including a top surface, a bottom surface and a containing wall all of which are attached to one another to form a space within which there is located a bath of molten metal that covers the bottom surface and contacts a lower portion of the containing wall;
   a delivery device for delivering a free falling molten glass having a liquidus viscosity less than 1000 poises onto a portion of the molten metal located in a delivery area within the structure; and
   at least one device for eliminating dead zones in the delivery area to reduce a residence time of the molten glass in the delivery area to enable a substantially continuous flow of the molten glass in a downstream direction away from the delivery area when forming a glass sheet,
   wherein the at least one device includes the containing wall having a substantially semi-circular channel around the delivery area and a substantially diverging channel extending in the downstream direction, the containing wall being shaped to limit contact between the molten glass and the semi-circular channel.

2. The glass forming system of claim 1, wherein the at least one device includes a gas supply that provides a gas which passes through a plurality of pores extending through at least a portion of the containing wall associated with the delivery area so as to form a gas cushion which repels the molten glass away from at least that portion of the containing wall.

3. The glass forming system according to claim 1, wherein the at least one device includes the delivery device being chosen from a tube, rod or needle through which or around the molten glass flows before free falling from a height that is less than 100 mm into the delivery area.

4. The glass forming system according to claim 1, wherein the at least one device includes the delivery device being bent to orient the flow of the free falling molten glass that is received in the delivery area in a downstream direction away from the delivery area.

5. The glass forming system according to claim 1, wherein the at least one device includes the delivery device having a heater that heats the molten glass to control a viscosity of the molten glass that is free falling onto the portion of the molten metal.

6. The glass forming system according to claim 1, wherein the structure further includes one or more cooling elements that cool the molten glass that is located therein on the molten metal.

7. The glass forming system according to claim 1, wherein the structure includes:
- the delivery area where the free falling molten glass is delivered to the molten metal;
- a diverging area where the delivered molten glass flowing on the molten metal spreads until reaching an equilibrium thickness;
- a thermal conditioning area where the spread molten glass flowing on the molten metal is cooled; and
- a float drawing area where the cooled molten glass flowing on the molten metal is drawn to from the glass sheet.

* * * * *